United States Patent [19]
Zollinger et al.

[11] 3,978,995
[45] Sept. 7, 1976

[54] MOBILE TIER PICKING APPARATUS FOR A WAREHOUSING SYSTEM

[75] Inventors: Howard A. Zollinger, Ada Township, Kent County; LeRoy Lubbers, Grand Rapids, both of Mich.

[73] Assignee: Rapistan, Incorporated, Grand Rapids, Mich.

[22] Filed: Nov. 11, 1974

[21] Appl. No.: 522,724

Related U.S. Application Data

[62] Division of Ser. No. 332,903, Feb. 15, 1973, Pat. No. 3,866,767.

[52] U.S. Cl. .......................................... 214/16.4 A
[51] Int. Cl.² ........................................ B65G 1/06
[58] Field of Search ................ 214/16.4 A, 16.4 B, 214/16 B, 650 SG

[56] References Cited
UNITED STATES PATENTS

| | | | |
|---|---|---|---|
| 1,927,677 | 9/1933 | Bennington | 214/16.4 B |
| 3,206,041 | 9/1965 | McGrath | 214/650 SG |
| 3,351,219 | 11/1967 | Ruderfer | 214/16.4 A |
| 3,428,195 | 2/1969 | Pamer | 214/16.4 D |
| 3,519,150 | 7/1970 | Keenan et al. | 214/16.4 B |
| 3,716,147 | 2/1973 | Pipes | 214/16.4 A |
| 3,782,564 | 1/1974 | Burt | 214/16.4 A |
| 3,880,299 | 4/1975 | Zollinger et al. | 214/16.4 A |

FOREIGN PATENTS OR APPLICATIONS

| | | | |
|---|---|---|---|
| 262,893 | 6/1968 | Austria | 214/16.4 B |
| 1,292,581 | 4/1969 | Germany | 214/16.4 A |
| 1,938,473 | 4/1971 | Germany | 214/16.4 A |
| 703,068 | 4/1966 | Italy | 214/16.4 A |
| 1,176,652 | 12/1969 | United Kingdom | 214/16.4 A |
| 218,390 | 5/1969 | U.S.S.R. | 16.4 A/ |

*Primary Examiner*—Robert J. Spar
*Assistant Examiner*—R. B. Johnson
*Attorney, Agent, or Firm*—Price, Heneveld, Huizenger & Cooper

[57] ABSTRACT

A warehousing system comprises an array of storage bins arranged in vertical tiers with the tiers arranged in rows having access aisles extending along the rows. A mobile vertical life moves along the ends of the aisles and carries thereon a mobile transfer vehicle which can be elevated by the mobile vertical lift to any desired storage level and discharged therefrom onto rails extending along each storage level of each access aisle. The self-powered mobile transfer vehicle includes forks for transferring loads between the vehicle and a storage bin. At least one of the transfer vehicles in the system is a tier picking vehicle including a vacuum operated picking head mounted to be lowered and raised between the picking vehicle and a make-up transfer vehicle below the picking vehicle. In one embodiment, the vacuum picking head is mounted on extensible arms of the tier picking vehicle and can be extended into a storage bin such that the tiers of articles picked directly from a palletized load in a storage location can be transferred to the make-up transfer vehicle in the same aisle and positioned below and in alignment with the picking vehicle.

5 Claims, 8 Drawing Figures

MOBILE TIER PICKING APPARATUS FOR A WAREHOUSING SYSTEM

This is a division, of application Ser. No. 332,903, filed Feb. 15, 1973 now U.S. Pat. No. 3,866,767 issued Feb. 18, 1975.

BACKGROUND OF THE INVENTION

The present invention relates to warehousing systems and particularly to a system employing a mobile tier picking vehicle.

When selectively picking cartons from palletized loads of cartons, systems employing vacuum operated tier picking devices frequently require that the palletized loads be brought to a fixed tier picking location which includes a vacuum tier picking apparatus that selectively removes a tier of cartons from the palletized loads and transfers tier picked articles to a make-up pallet. The remaining cartons on the picking pallet must then be returned to storage by conventional load transferring means. U.S. Pat. No. 2,716,497 issued on Aug. 30, 1955 to E. A. Wahl et al., is representative of a system employing a typical fixed tier picking station. It is apparent that considerable inefficiency is inherent in the design of such systems since palletized loads must be taken out of storage, transferred to the picking station, returned to the storage area and then reinserted into storage Recently, it has been suggested to incorporate tier picking mechanism on a stacker crane type of vehicle which can travel within an access aisle and remove palletized loads from storage and transfer tiers of articles from the removed picking pallet onto a make-up pallet also on the crane. The remaining articles on the picking pallet are then returned to storage. The stacker crane can progress along the aisle tier picking different articles until an entire pallet of tier picked articles has been loaded onto the make-up pallet and then transfer the make-up load to an output station for shipment or the like.

Although such a system represents an improvement over the fixed tier picking arrangement, the use of stacker cranes limits the through-put capacity of such a system since the vertically movable apparatus generally will take up an entire access aisle thereby prohibiting additional stacking cranes from operating in the aisle for picking entire or partial pallet loads. Additionally, when the make-up load is completed, the stacker crane and vacuum picker thereon must travel to a discharge location to transfer the make-up pallet thereby tying up the tier picking equipment during this period.

The warehousing system described in detail in a copending application entitled WAREHOUSING SYSTEM filed on July 17, 1972, Ser. No. 272,287 now U.S. Pat. No. 3,880,299 and assigned to the present assignee, incorporates a plurality of mobile transfer vehicles adapted to be dispatched into access aisles of a storage system and transfer unitized loads between the vehicle and storage bins along the aisle. In this system, the mobile transfer vehicles include means thereon for transferring loads between the vehicle and the storage location to facilitate the automatic storing and retrieving sequence of operation. One or more mobile vertical lifts travel across the ends of the access aisles to transport the mobile transfer vehicles to different aisle levels or aisles. As described in detail in the above identified application, which is incorporated by reference herein, such a system overcomes theh through-put limitations inherent in a stacker crane or other known warehousing systems.

SUMMARY OF THE INVENTION

The apparatus of the present invention overcomes the limitations of prior tier picking systems by providing an independently movable tier picking vehicle which can be a mobile transfer vehicle of the type described in the above identified application with a vertically movable tier picking head. In one embodiment, the tier picking vehicle is controlled in conjunction with a pair of mobile transfer vehicles positioned in an access aisle below the tier picking vehicle. A first of the transfer vehicles operates to retrieve a palletized load while the second (or make-up) mobile transfer vehicle acts as receiving means receiving tiers of articles from the tier picking vehicle which is shuttled above the retrieving and makeup vehicles.

When tiers of different items are being picked, the retrieving vehicle returns remaining unitized loads to the storage bin and proceeds together with the tier picking vehicle and make up vehicle to a different aisle position where a different unitized load is removed from a storage bin and made accessible to the tier picking vehicle.

The cycle can be repeated until the make-up vehicle has a completed pallet load at which time it is dispatched to a discharge location while the tier picking and retrievel vehicles can continue to operate with a different, empty make-up vehicle. This method and the apparatus used therewith eliminates the inefficiencies of combining the tier picking, retrieving and make-up equipment on a single vehicle or at a fixed location.

In one embodiment, the vacuum picking head of the tier picking vehicle is mounted in a pair of arms extendible into a storage bin above the unitized loads. In this system, the retrieval vehicle is eliminated since the picking vehicle functions to retrieve the tier of articles directly from storage.

It is an object, therefore, of the present invention to provide an improved highly efficient tier picking method for picking selected articles from different storage locations in a warehouse and for palletizing the picked tiers of articles.

It is another object of the present invention to provide independently movable mobile tier picking vehicles and make-up vehicles.

An additional object of the present invention is to provide a tier picking vehicle which is compatible with a warehousing system employing a plurality of mobile transfer vehicles movable along selected levels of each access aisle of the system.

A further object of the present invention is to provide predetermined locations for discharging unitized loads made up of tiers of different articles for further transfer by means of separate mobile transfer vehicles.

Another object of the present invention is to provide an independently movable mobile tier picking vehicle for transferring tiers of articles within a warehouse system.

These and other objects of the present invention will become apparent upon reading the followiing description thereof in conjunction with the accompanying drawings in which:

DETAILED DESCRIPTION OF THE PREFERRED EMBODIMENT

Figure 1:
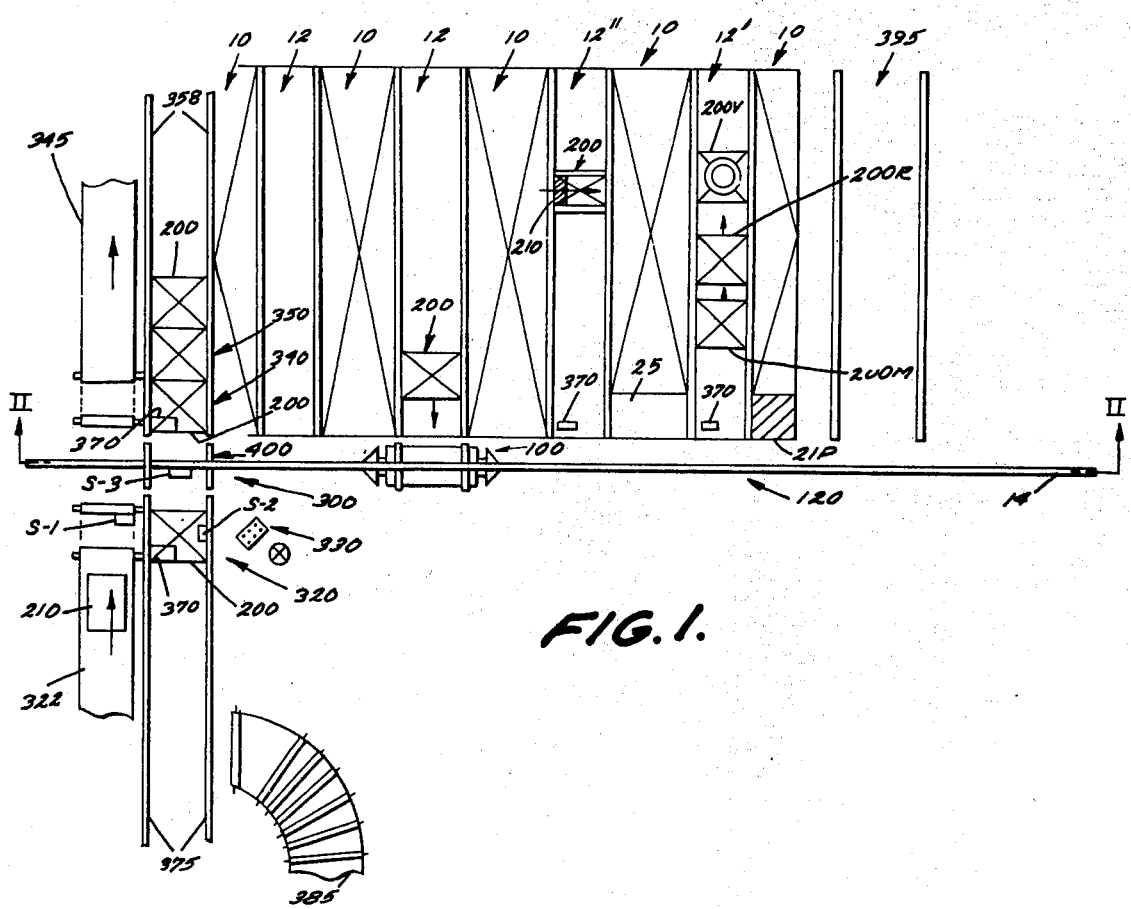
FIG. 1 is a schematic plan view of a warehousing system embodying the present invention.
Figure 2:
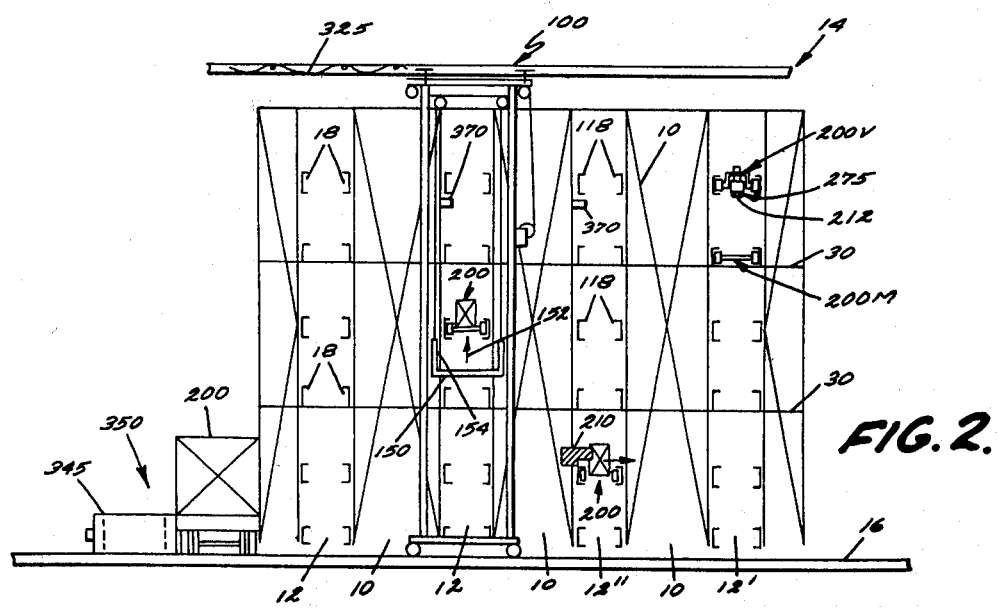
FIG. 2 is a schematic side elevation view of the warehousing system of FIG. 1.

Referring now in detail to FIGS. 1 and 2, there is shown a warehousing system comprising a plurality of storage racks 10 separated by aisles 12 therebetween which extend along the length of the storage racks 10. The racks are divided into a plurality of levels and individual storage bins which form an array of storage locations adapted to receive unitized loads typically comprising tiers of individual articles. Fire barriers 30 (FIG. 2) extend horizontally through the storage rack area but not through the transverse aisle 120 in which the mobile vertical lift 100 travels.

Each aisle level includes one or more storage bins 21P (one shown for aisle 12' in FIG. 1) in which a supply of empty pallets are stacked. As explained below, the pallets therein are singly removable and are picked up by make-up vehicles as necessary. Each aisle level further includes a flow rack 25 (one shown between aisles 12'' and 12' in FIG. 1) communicating between adjacent aisles. The flow racks can be of conventional powered or gravity design and as explained below, serve to transfer palletized loads made up of tiers of articles from a tier picking aisle to an adjacent aisle.

A transverse aisle 120 extends along one end of the aisles 12 between the two sections of storage racks, and a mobile vertical lift 100 adapted to engage monorails 14 and 16 traverses aisle 120. The mobile vertical lift (trans-aisle vehicle) 100 is adapted to receive any one of a plurality of mobile transfer vehicles 200 which are dispatched into the aisles 12 of the storage system so that materials can be transferred into and out of the storage bins by the transfer vehicles 200.

The mobile vertical lift 100 operates between a home station generally indicated at 300 which includes input and output stations 320 and 340, respectively, which serves as an interface between the warehousing system and other systems such as a receiving station or shipping station respectively. The warehousing system further includes a transfer vehicle storage magazine 350 communicant with the output station 340 and adapted to store transfer vehicles when not in use. A retractable bridge 400 facilitates the movement of transfer vehicles 200 between the output station 340 across the monorail 16 and the input station 320 area when the mobile vertical lift 100 is not at the home station.

The mobile vertical lift 100 includes a vertically movable lift platform 150 thereon which has a carriage assembly which carries the mobile transfer vehicles 200 by means of guide rails 154 adapted to receive guide wheels on the mobile transfer vehicles 200. The lift platform 150 is shown in FIG. 2 moving upwardly as indicated by the arrow 152 to an aisle level where a transfer vehicle 200 is in position to be received by the mobile vertical lift 100. When the mobile vertical lift is in position, the guide rails 154 are aligned with horizontal guide rails 18 extending along the aisles 12 of storage racks 10 such that the transfer vehicle 200 can transfer between the mobile vertical lift 100 and aisles 12.

The transfer vehicles 200 are self-powered and are guided within the storage racks 10 along the aisles 12 by means of the guide rails 18 at a predetermined vertical height such that palletized loads 210 can be automatically transferred betwen storage locations within the storage racks and the mobile transfer vehicles 200 by transfer means carried on the vehicles 200. In FIGS. 1 and 2, arrows accompanying the palletized loads 210 and the transfer vehicles 200 indicate the direction of movement of the loads into and out of storage and the transfer vehicle motion toward the mobile vertical lift 100.

The mobile vertical lift 100 can be directly coupled to a control station 330 (FIG. 1) by means of a festoon cable 325 as shown in FIG. 2, to receive positional information from a computer to control the movement of the vertical lift 100 and direct the movement of the transfer vehicles 200. The cable 325 also provides the mobile vertical lift 100 with operating power for its drive motors. The mobile vertical lift can also be controlled semi-automatically by employing a punched card or like system in which an operator inserts such a card into a reader on the lift to control its movement within the system. Likewise, it is possible to manually control the positioning of the lift by carrying an operator thereon and providing suitable operator controls.

Each mobile transfer vehicle 200 includes its own drive mechanism and power supply such that it is self-powered in its motion within the aisles 12. The input/output station rails (375 and 358) include an electrical supply bus or collector bar and each mobile transfer vehicle includes a contact shoe adapted to slidably engage the collector bar such that when the transfer vehicle is at the home station area, it can be externally powered to conserve the electrical energy stored in its batteries. It is noted that such a conventional power supply can be employed at various of the warehouse areas including the access aisles if desired although in the preferred embodiment, the transfer vehicles are self-powered when in the aisles.

the warehousing system shown in FIGS. 1–3 includes at least one tier picking vehicle 200V which comprises a mobile transfer vehicle having a tier picking head 275 mounted thereto and movable such that it can remove tiers of articles from a retrieval vehicle 200R (FIG. 1) positioned in alignment an aisle below the picking vehicle. This permits the transfer of the tier or a partial tier of articles so picked to make-up vehicle 200M as explained in greater detail below. Depending upon the size of the warehouse installation, several tier picking vehicles 200V may be employed. The make-up and retrieval vehicles 200M and 200R, respectively, are generally the same as the remaining mobile transfer vehicles 200 and are designated by the suffixes M and R for the purpose of discussing the operation of the tier picking system.

FIGS. 1 and 2 illustrate the use of the materials handling system to interface with the input and output stations 320 and 340. The input station 320 has a conveyor 322 for transferring materials from a receiving station for example, in a warehousing facility to the input station where materials are picked up by a mobile transfer vehicle 200 at the input station 320 on guide rails 375. The output station 340 has a conveyor 345 associated therewith which receives materials from a transfer vehicle 200 at the output station on rails 358 also associated with and extending into the vehicle storage magazine 350. Conveyor 345 then transfers materials to a shipping dock for example, that is associated with the warehousing system.

In addition, the facility shown in FIGS. 1 and 2 may include additional input and output means such as the guide rails 375 which are adapted to guide transfer vehicles 200 to a different facility such as an assembly line within the system. A shunting or stub conveyor 385 may be located adjacent the rails 375 to receive preselected loads from some of the transfer vehicles 200 and carry them to a different area, such as a packaging station. Also, another set of guide rails 395 may be provided at an opposite end of the storage racks for guiding vehicles 200 to a repair facility, maintenance facility, or any other of a number of different facilities. Thus, it is seen by employing a self-powered transfer vehicle 200, the vehicle itself may, under its own power and programmed intelligence, move between the warehouse facilities shown in FIGS. 1 and 2 to other facilities by means of rails 375 and 395 or may transfer loads thereon to various facilities as indicated by the associated conveyors 322, 345 and 385.

Figure 3:
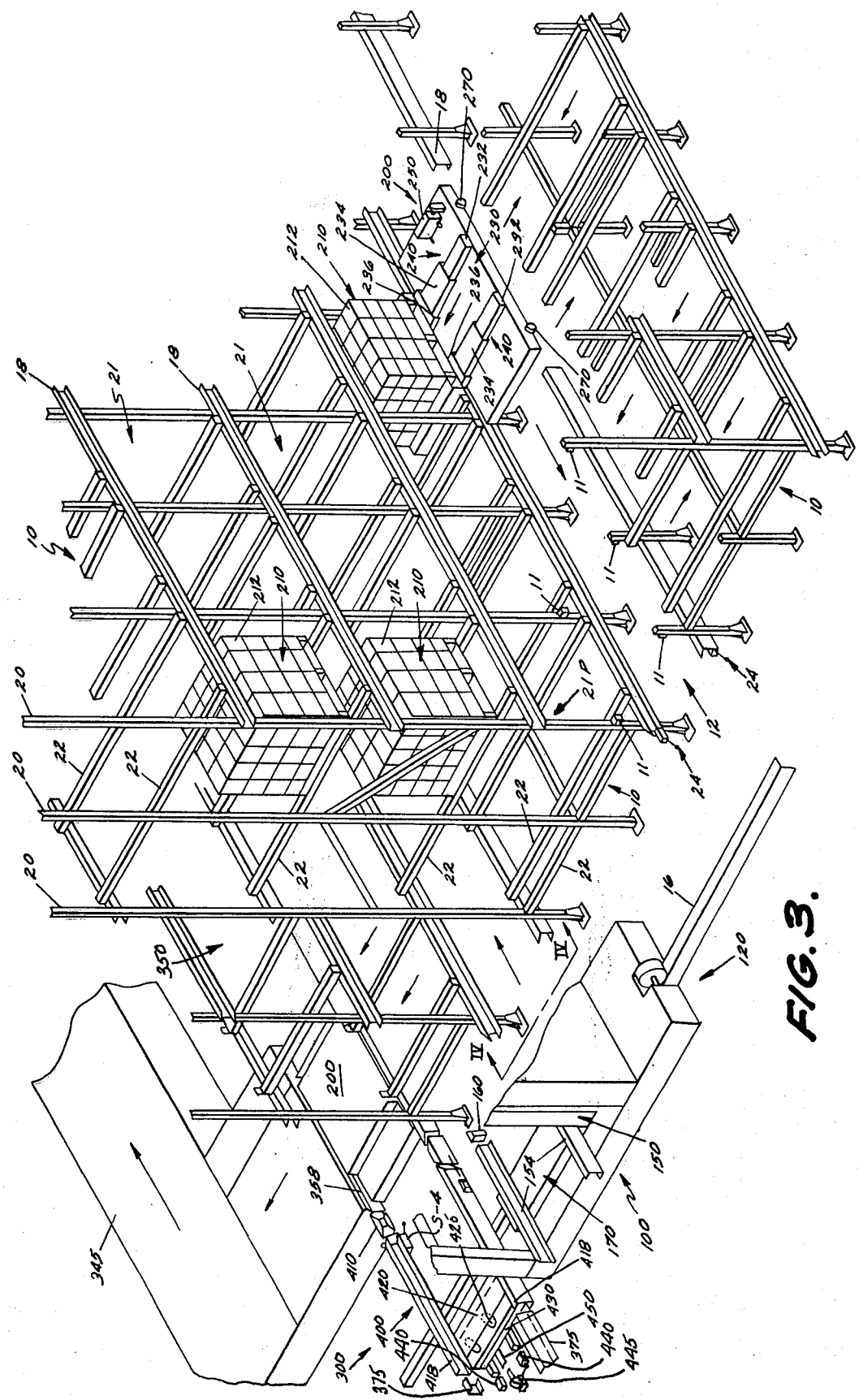
FIG. 3 is a fragmentary perspective view of the warehousing system of the present invention.

Referring now to FIG. 3, there is shown a perspective view of a portion of the warehousing system shown in FIGS. 1 and 2, showing a cutaway portion of a mobile vertical lift 100 and a mobile transfer vehicle 200 which can serve as a retrieval vehicle 200R or a make-up vehicle 200M.

The storage racks 10 comprise vertical supports 20 and load supports 22 that define individual storage bins 21 forming an array along each aisle. The bins 21 are adapted to receive standard palletized loads 210 made up of tiers 212 of articles as shown. As noted above, one or more pallet bins 21P is provided at each storage level of each access aisle to supply empty make-up pallets. Suitable pallet dispensing means are provided in the bins 21P to singly dispense make-up pallets to the make-up vehicles 200M.

The warehousing system is divided into dual sections of arrays of bins 21 that are accessible from adjacent aisles 12. The guide rails 18 form a portion of the horizontal support members for the storage racks 10 as well as providing support for the transfer vehicles 200. As een in FIG. 3, the carriage assembly 170 on the mobile vertical lift 100 also includes guide rails 154 which are adapted to be aligned with the rails 18 such that a transfer vehicle 200 can be transferred from the storage rack 10 onto the lifting platform 150 of the mobile transfer vehicle 100 on which the carriage assembly rests.

All transfer vehicles 200, 200V, 200M and 200R include a drive motor 250 coupled to guide wheels 270 which ride within the guide rails 18. The vehicle construction and the drive control therefor is described in detail in the copending application identified supra. The vacuum picking vehicle which differs from the remaining vehicles, is described below with reference to FIGS. 4 and 5.

Each of the transfer vehicles 200, 200M and 200R includes means 230 (FIG. 3) for transferring palletized loads 210 between a storage bin 21 and the vehicle 200 or between the conveyors 322, 345 and 385 and the vehicle. In the preferred embodiment, means 230 comprise a pair of forks 240 each comprising a three-sectional platform having a vertically movable base 232, a middle section 234 movable to either side of the vehicle 200, and a top section 236 extendible to either side in relation to the middle section 234 and which fits under a palletized load 210 for lifting and transferring the load to and from the vehicle 200.

The home station area 300 where the mobile transfer vehicles 200 are transferred to and from the mobile vertical lift 100, includes a retractable bridge 400 as shown in FIG. 3. The bridge comprises a pair of guide rails 418 mounted above the monorail 16 on which the mobile vertical lift travels and which are lowerable and retractable under the guide rails 375 shown in FIGS. 1 and 3. When the mobile vertical lift 100 enters the home station area 300, the tracks 418 are retracted out of the way so as not to obstruct the movement of the mobile vertical lift. This is accomplished by mounting the guide rails 418 of the bridge 400 on a platform 420 which is mounted to an additional platform 430 by means of a pair of actuation cylinders 425. This arrangement allows the platform 420 to be elevated and lowered in relation to the platform 430. Platform 430 is at approximately ground level and is mounted by means of guide wheels within a pair of tracks 440 such that it is longitudinally movable in a direction parallel to the tracks 375 and perpendicular to the monorail 16.

A motor 445 with a drive belt 450 coupled to the platform 430 can be actuated to cause the platform 430 and, therefore, the platform 425 and rails 418 thereon to be drawn to the left in FIG. 3 out of the way of mobile vertical lift 100, once the rails 418 have been lowered by means of the cylinders 425. The bridge 400 is positioned when the mobile vertical lift 100 is not at the home station to provide a transfer path for the mobile transfer vehicles 200 from the output station 240 into the input station 320. The bridge also allows a transfer vehicle 200 to receive a palletized load 210 from the input station 320 or to move along the tracks 375 to transfer loads to the stub conveyor 385 or otherwise operate between the input and output stations 320 and 340, respectively, without requiring the presence of the mobile vertical lift 100. By so designing the system, the transfer vehicles 200 can be utilized to their maximum efficiency as can the mobile vertical lift 100.

Both the guide rails 418 of the bridge 400 and the guide rails 154 of the carriage assembly 170 associated with the mobile vertical lift 100 have locating means 410 and 160, respectively, which are employed in conjunction with tapered ends of the guide rails 18 in the storage racks 10 to accurately align the guide rails 154, 418 with the storage rack guide rails 18 such that the transfer vehicles 200 can easily be transferred into and out of the storage rack aisles 12. The guide rails 18 each include stops 24 (only two shown in FIG. 3) at the ends of the rails 18 adjacent the aisle 120 to prevent the vehicles from accidentally slipping from the aisle level when the mobile vertical lift 100 is not in position to receive the vehicle The operation of the transfer vehicles and mobile lift to transfer entire unitized loads 210 into and out of storage is described in detail in the above-identified copending application and will not be repeated here. A description of the picking vehicle with a vacuum picking head to transfer full or partial tiers 212 of articles is now presented.

Figure 4:
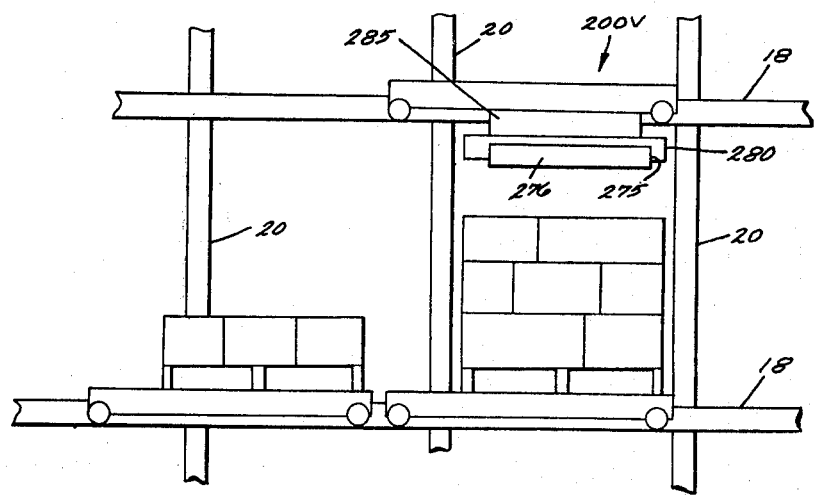
FIG. 4 is a schematic side elevation view of one embodiment of the present invention.
Figure 5:
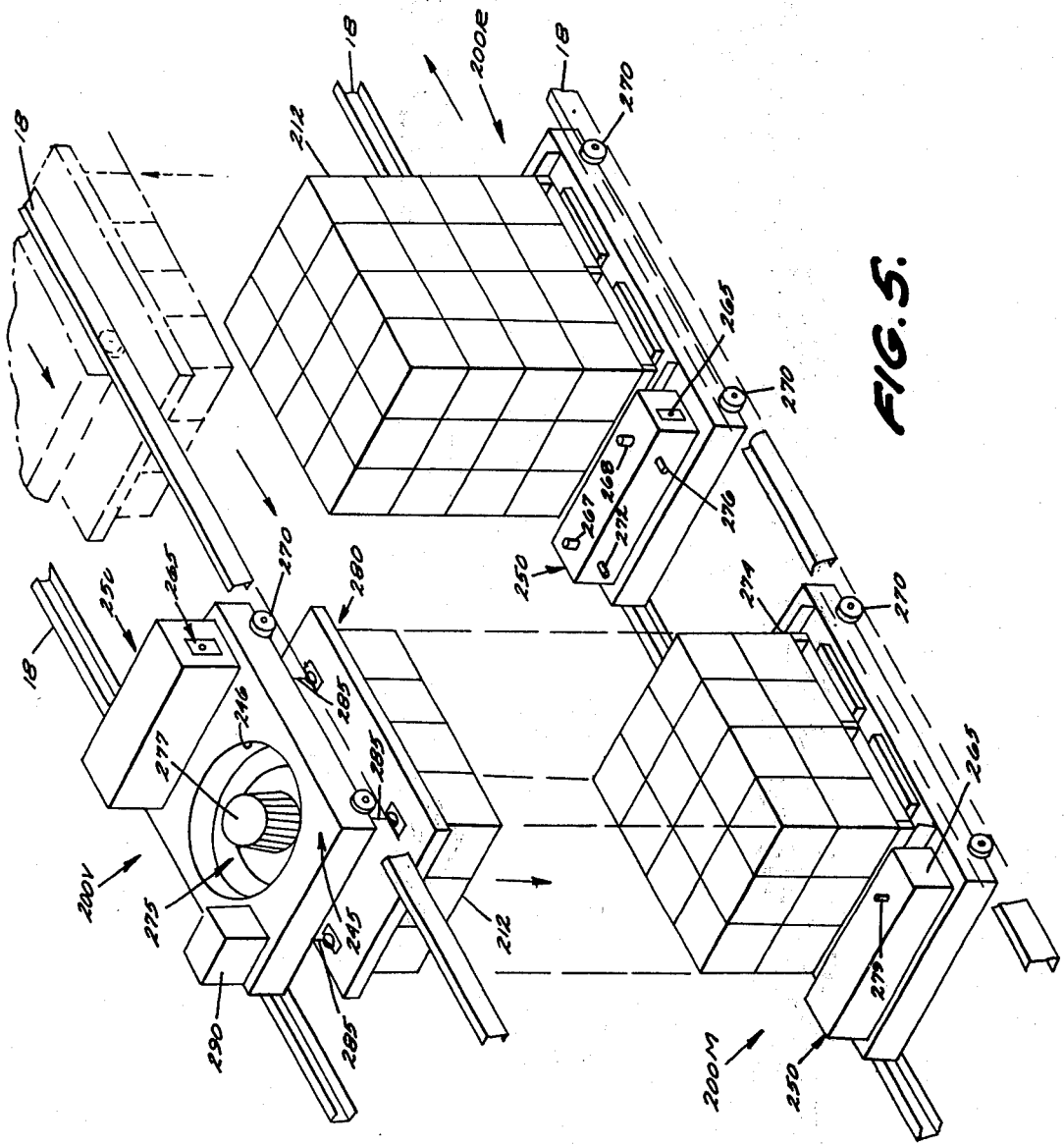
FIG. 5 is a fragmentary perspective view of the embodiment shown in FIG. 4.

Referring to FIGS. 4 and 5, there is seen one embodiment of the present invention in which the picking vehicle 200V is dispatched from a mobile vertical lift to an aisle level above the retrieval and make-up vehicles 200R and 200M, respectively. Vehicle 200V is controlled to move along the rails 18 on wheels 270 to shuttle between the tier picking position shown in FIG. 4 (and in phantom form in FIG. 5) and the tier dispatching position shown in solid lines in FIG. 5.

The picking vehicle 200V comprises a mobile transfer vehicle drive motor and control unit 250 mounted on a frame 245 and including a column detecting means 265 such that the vehicle can be alternately positioned in alignment with predetermined storage bin columns 20. In place of the shuttle fork, however, the vehicle includes a vertically movable platform 280 coupled to frame 245 by means of suitable support cables 285 which are raised and lowered by means of a motor driven hoist and guide pulley unit 290 positioned on the frame. Mounted on the platform 280 is picking means which, in the preferred embodiment, is a vacuum operated picking head 275 including a blower motor 277 for forming a partial vacuum at the gripping surface of the head which communicates with the top surface of a tier of articles to be picked and transferred from the retrieval to the make-up vehicles. Other picking means such as carton clamps or the like may also be used for tier picking.

Frame 245 includes a central aperture 246 which permits the vacuum head to retract to a fully raised position when vehicle 200V is in motion. The platform 280 seats within the frame in this position to hold the tier picked articles in a stable position during their transfer. This arrangement eliminates swinging of the articles from cables 285. The vacuum head 275 mounted on the mobile tier picking vehicle 200V can be of the type described in U.S. Pat. Nos. 3,313,568 issued to D. A. Fogg on Apr. 11, 1967, or 3,598,439 issued to Ernest A. Dahlquist et al. on Aug. 10, 1971; both of which are assigned to the present assignee.

The make-up vehicle 200M can be hitched to the retrieval vehicle 200R by means of a tongue and hitch combination such that only one of the vehicles need be powered and controlled. More frequently, however, it is desirable to control the vehicle independently such that once the palletized load on the make-up vehicle has been completed, it can be dispatched to one of the flow racks 25 for discharging full pallets thereon.

OPERATION

Figure 8:
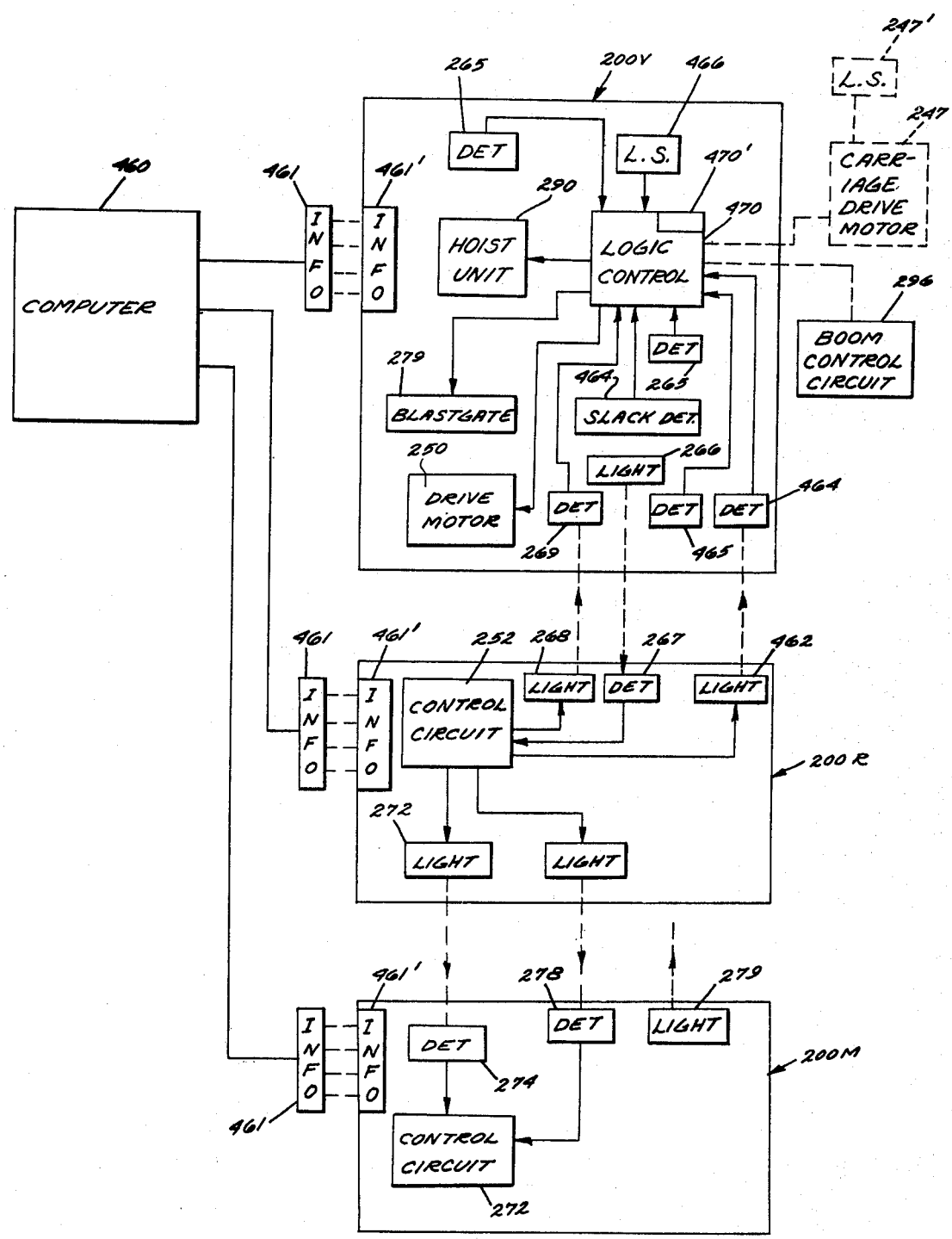
FIG. 8 is an electrical circuit diagram in block form of the control system for the present invention.

Referring now to the electrical control circuit diagram of FIG. 8 in conjunction with FIGS. 4 and 5, a master control computer 460 dispatches the picking vehicle 200V to the aisle level above the articles to be tier picked in vertical alignment with the storage bin. Information from the computer is fed to the vehicles through information transfer panels 461' positioned on the vehicles via panels 461 located on a mobile vertical lift or at the aisle ends.

The retrieval vehicle 200R is dispatched to the storage location and make-up vehicle 200M is dispatched to the same aisle level to a storage bin two bins away from the stored articles to be picked (since each of the transfer vehicles is slightly longer than the width of a single bin). The control circuits and their operation to dispatch the vehicles to desired storage positions in the warehouse is discussed in detail in the copending application identified supra and will not be repeated here. It is noted, however, that once the vehicles are initially dispatched, the retrieval vehicle generally serves as the intelligence carrying vehicle and serves to control the shifting and repositioning of the picking and make-up vehicles as described below. Once vehicle 200R is positioned, its forks are actuated automatically to retrieve the entire pallet load or whatever articles remain on the pallet in the desired storage bin and bring them onto the vehicle where they are within the aisle and accessible to the picking vehicle aligned overhead.

After the pallet is aligned on the retrieval vehicle, the retracted shuttle forks actuate a light 462 on vehicle 200R which is directed toward an optical sensor 464 on the aligned picking vehicle 200V. Detector 464 applies a control signal to the picking vehicle logic and control circuit 470 to initiate the sequence of operation of the picking head and the vehicle. It is noted here that the control circuit 252 maintains the retrieval vehicle in position once the pallet is retrieved and moves the retrieval vehicle to the next picking location only after the pallet has been returned to storage.

Circuit 470 actuates hoist unit 290 which lowers platform 280 with the vacuum picking head 275 thereon until the picking head contacts the uppermost tier of articles on vehicles 200R. The vacuum head blower motor 277 is continuously operated and the selectively operated blast gate 279 (FIG. 8) which forms an integral part of the picking head, is in a position to apply a partial vacuum to the picking surface 275 (FIG. 4) of the head. As the picking head rests on the uppermost tier of articles, a slack cable detector 464 physically positioned on frame 245 to detect the slack in cables 285 is actuated and applies a signal to circuit 470 which reverses the hoist unit 290. The picking head and platform 285 are then raised to the uppermost position lifting the tier of articles from the retrieval pallet.

In the raised position, platform 280 trips a limit switch 466 positioned on frame 245 to deactuate hoist unit 290 and actuate the vehicle drive motor 250. Circuit 470 includes a program or subroutine 470' for controlling drive motor 250 to shift the vehicle down two storage bins as indicated by column detector 265 and then returning vehicle 200V to the aligned position over vehicle 200R after the picked tier has been released. The hardware forming the subroutine 470' can be of conventional design incorporating storage and shift registers together with comparators to provide a position control signal to the drive motor 250.

Once the picking vehicle 200V is aligned with the tier receiving means comprising make-up vehicle 200M; a light source 279 on vehicle 200M directs a beam of light to a detector 465 on vehicle 200V verifying the alignment of the vehicles. Detector 465, in response to the received light, applies a signal to logic circuit 470 which initiates the transfer sequence. Hoist unit 290 is actuated by circuit 470 to lower the picked tier of articles onto the pallet positioned on the make-up vehicle. When the slack cable condition is again detected by sensor 464', the blast gate 279 is actuated by circuit 470 to shut off the vacuum to the picking surface 276 of the head thereby causing the tier of articles to be deposited on the awaiting pallet. The blast gate is opened after the picking head is raised to trigger switch 466.

After a momentary delay allowing the articles to be deposited onto the make-up pallet, the hoist unit is reversed by the logic and control circuit 470 and upon its retraction into the frame of the picking vehicle 200V, limit switch 466 is again actuated generating a signal applied to circuit 470 which causes the drive motor to shift the vehicle into an aligned position once again over the retrieval vehicle 200R.

Once vehicle 200V has reached the aligned position detected by the column detector 265, control circuit 470 actuates a light 266 on the picking vehicle which is directed toward a light sensitive detector 267 on the retrieval vehicle 200R. If more than one tier of articles is to be picked, detector 267 causes the control circuit 252 to once again actuate light 462 which in turn is sensed by detector 464 on vehicle 200V to initiate another cycle of operation of the picking head and vehicle.

In the event that only a single tier is to be picked, detection of the light 266 by sensor 267 causes the actuation of a control light 268 on the retrieval vehicle 200R. This light is directed toward a light sensitive detector 269 on vehicle 200V which is employed to provide a control signal to the logic and control circuit 470 which in turn signals the vehicle 200V to return to an aisle and where the information transfer panel 461' is aligned with an information transfer panel 461 to receive additional information as to the next picking location. As discussed in the copending application identified above, vehicle 200V can be programmed, however, for automatic successive picking locations in which case the actuation of sensor 269 causes the circuit 470 to actuate drive motor 250 to proceed to transport the vehicle to the next picking location.

As vehicle 200V is transferring to the next picking location, vehicle 200R which has received a signal from the picking vehicle via sensor 267, either maintains the pallet in an available position for the picking vehicle (in the event that more than one tier is to be picked) or if only one tier is being picked, is free to return the remaining articles on the pallet to the storage bin as soon as the picking vehicle has removed the single tier. Once the empty shuttle forks have been retracted onto the vehicle, control circuit 252 controls the vehicle which then proceeds to the next picking or other desired location in the system.

The make-up vehicle 200M on which the tier or tiers of articles have been deposited can either transfer the picked tier of articles to one of the aisle end flow racks 25 (FIG. 1) or can follow the retrieval vehicle 200R to the next picking location. As soon as the make-up vehicle has received the last tier of articles from the picking vehicle, it is free to move independently of the picking vehicle and can return to the aisle end for transfer by the mobile vertical lift. In order to automatically control the make-up vehicle 200M once initially positioned, a light source 272 on the retrieval vehicle 200R directs a beam of light to a light sensitive detector 274 positioned on vehicle 200M. Light 272 will be activated in the event it is desired to send the make-up vehicle 200M to an aisle end to discharge the completed pallet thereon. Upon receipt of a signal by sensor 274, it develops a control signal applied to the control circuit 272 of vehicle 200M to cause the vehicle to travel to the flow rack and discharge its pallet and return to an aisle end to await further programming via panels 461, 461'.

In the event, however, that it is desired to have the make-up vehicle follow the mobile transfer vehicle to the next picking location and stop in an aligned position two bins away, a second light source 276 on the retrieval vehicle 200R is activated and directs a beam of light to a light sensitive detector 278 on vehicle 200M. Sensor 278 is also coupled to the control circuit 272 of vehicle 200M and generates a signal causing the vehicle to move the same number of bins as the retrieval vehicle moves and stop once a retrieval vehicle has been positioned and light 276 extinguished.

In this manner, the retrieval, picking, and make-up vehicles repeat the cycle of operation and travel along an aisle to selected storage locations to tier pick articles under the control of a computer inventory system.

Once the pallet on the make-up vehicle is completed (for example, when five tiers have been picked), the make-up vehicle can also be dispatched by vehicle 200R to an end of the aisle where it can be picked up by a mobile vertical lift which then transfers the vehicle to an input or output station of the system as described in the copending application identified supra. Usually, however, the make-up vehicle will be dispatched to the flow rack 25 where it discharges the completed pallet to an adjacent aisle where another mobile transfer vehicle will pick up the completed pallet and transfer it to a mobile vertical lift thus freeing the make-up vehicle for further duty within the same aisle.

The retrieval and make-up vehicles are initially dispatched within an aisle by the computer to maximize their picking efficiency. In the event it becomes necessary to switch their positions, as for example when picking at opposite ends of the aisle, it is possible to reverse the interface detectors such that the make-up vehicle becomes the retrieval vehicle and vice versa. In such case, the vehicles 200R and 200M would carry identical control circuits and the light sources and detectors would be dual operating units.

In place of controlling the picking vehicle 200V with the conventional mobile transfer vehicle control mechanism to shuttle between aligned positions above the retrieval and make-up vehicles, a picking vehicle 200V' (FIG. 6) can be fabricated with an elongated frame 245' including a carriage assembly 248. In this embodiment, the vertically movable platform 280 to which the vacuum head is mounted is suspended from carriage 248 by cables 285 in the same manner as shown in FIGS. 4 and 5. The carriage assembly can be of conventional design including for example, fixed gear racks mounted on the inner sides of frame 245'. Rotatable drive gears on the carriage are employed for coupling the carriage to the racks such that the carriage can be reciprocated between the end positions.

Figure 6:
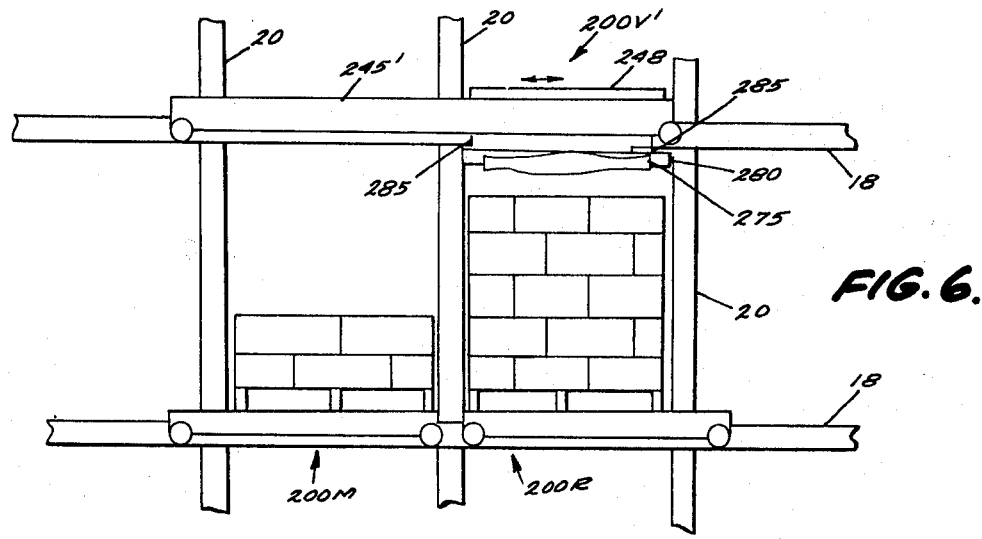
FIG. 6 is a schematic side elevational view of an alternative embodiment of the invention.

In the embodiment shown in FIG. 6, the make-up and retrieval vehicles are controlled in the same manner as those employed in the FIGS. 4 and 5 embodiment and the elongated frame 245' for the picking vehicle is centered above the retrieval and make-up vehicles such that the vacuum head will be aligned with one of the vehicles when the shuttle carriage 248 is at an end position. The same general control and drive for the vertically movable platform can be employed in the FIG. 6 embodiment as that employed in the FIGS. 4 and 5 embodiment. The only difference is illustrated in FIG. 8 in dotted lines where it is seen that the logic circuit 470 controls a drive motor 247 for the carriage in place of the vehicle drive motor during the tier picking operation. Limit switches 247' deactivate motor 247 when the carriage reaches an end position.

Figure 7:
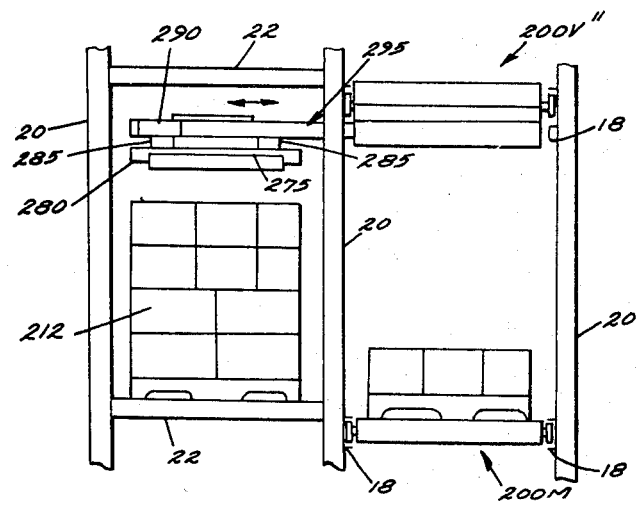
FIG. 7 is a schematic side elevational view of another embodiment of the invention.

Still a further embodiment of a picking vehicle 200V'' is illustrated by the schematic diagram of FIG. 7. In this embodiment, the retrieval vehicle is eliminated by providing a picking vehicle with an extension boom 295 which houses the vertically movable platform 280 and picking head 275 mounted thereto. Boom 295 is extended directly into a storage bin in the space above the stored articles. The vacuum head is then lowered into contact with the uppermost tier of articles of the stored pallet. The vacuum head is then raised and the boom retracted under the picking vehicle to center the picked tier of articles within the aisle. In this embodiment, the make-up vehicle is positioned in the aisle in which the stored articles are located and the picking vehicle is positioned in the aisle above the make-up vehicle. The extensible boom 295 is positioned under the frame of the vehicle so that it will not interfere with the guide rails 18 of the system.

Boom 295 can be the same type of structure with drive mechanism similar to the shuttle fork for the mobile transfer vehicles and which is described in detail in a copending applicatioon entitled MOBILE TRANSFER VEHICLE AND LOAD TRANSFERRING MEANS THEREFOR, Ser. No. 272,134, filed on July 27, 1972, and assigned to the present assignee. In the FIG. 7 embodiment, the shuttle fork to which the cable lifting mechanism is mounted is positioned under the frame instead of above the frame as described in the above identified copending application which is incorporated herein by reference.

The vacuum head for vehicle 200V'' is controlled by a circuit essentially the same as that shown for the vehicle 200V in FIG. 8. Since no retrieval vehicle is necessary, a light is positioned on the make-up vehicle to signal a detector on the picking vehicle to initiate the tier picking operation once the two vehicles are positioned in alignment within the aisles. The control 296 for the boom extension can be the same as that used for the shuttle forks in the mobile transfer vehicles and is illustrated by broken lines in FIG. 8. Vehicle 200V'' can be used independently under control of the computer for shifting single tiers of articles between different storage locations in the warehouse system. Likewise, individual tiers of articles can be taken to the flow racks 25 or other receiving areas in the system in much the same manner as the mobile transfer vehicles transfer entire pallet loads.

Various modifications to the embodiments shown can be made by those skilled in the art. For example, the vertical movement of the picking head can be accomplished by any suitable conventional mechanism. Additionally, the specific control including the optical interface between the vehicles can be modified to provide the desired results. In some installations, it may be desirable to provide manual control of the picking, retrieval and make-up vehicles. In such systems, one or more of these vehicles carry an operator who controls the movement of the vehicles in the aisles. The automatic alignment features can, however, be used for accurate final adjustment if desired. Thus, any desired degree of automation from the fully automatic mode described in the preferred embodiment to a fully manual system can be employed in the system of the present invention. These and other modifications to the present invention will, however, fall within the scope of the present invention as defined by the appended claims.

The embodiments of the invention in which an exclusive property or privelege is claimed are defined as follows:

1. In a materials handling system including storage racks with an array of storage locations for receiving and storing tiered articles and including access aisles extending adjacent the storage locations and having a pair of vertically spaced guide and support means thereon extending along discrete storage levels to provide access to an open end of each of the storage locations in the system, means for transferring tiers of articles within the system comprising:

a mobile tier picking vehicle for movement within a preselected access aisle along the upper one of a pair of vertically spaced guide and support means at a preselected discrete storage level within said aisle to transfer tiered articles within the storage aisle;

a picking head movably positioned on said tier picking vehicle for picking tiers of articles from unitized loads of tiered articles in said storage racks;

means for aligning in a predetermined manner a unitized load of tiered articles stored within said system and said picking head;

a separate independently operable mobile make-up vehicle dispatched on the lower one of said pair of vertically spaced guide and support means in said preselected aisle below and aligned under said tier picking vehicle to receive picked tiers of articles from said picking head of said mobile transfer picking vehicle; and control means for moving said picking head into contact with said tier of articles and for shifting the position of said picking head to transfer said tier of articles from said unitized load to said mobile transfer vehicle.

2. The system as defined in claim 2 wherein said tier picking vehicle includes a frame having a hoist unit positioned thereon, and means for coupling said picking head to said hoist unit such that said picking head can be lowered to pick or deposit a tier of articles and raised to transport said tier of articles.

3. The system as defined in claim 2 wherein said means for aligning a unitized load and said picking head of said tier picking vehicle comprises a retrieval mobile transfer vehicle dispatched in an aisle level and storage location aligned below said tier picking vehicle and including load transferring means thereon for retrieving a unitized load from a storage bin and positioning said load in said aisle where it is accessible to said picking head.

4. The system as defined in claim 1 wherein said means for aligning a unitized load and said picking head of said tier picking vehicle comprises an extensible boom positioned on said tier picking vehicle and to which said picking head is coupled, and control means for extending said boom into a storage bin to position said picking head above a unitized load therein.

5. In a warehousing system having a plurality of access aisles running along an array of storage bins for receiving and storing unitized loads, said access aisles including pairs of vertically spaced guide and support means therein, each guide and support means associated with a single storage bin level, materials handling apparatus comprising the combination of:

a mobile transfer vehicle movable along a lower one of a pair of said guide and support means at any preselected discrete storage level in an access aisle;

control means for actuating said mobile transfer vehicle to align with a predetermined storage location in an access aisle;

a mobile picking vehicle movable along the upper one of said pair of guide and support means of any preselected discrete storage level and an access aisle;

a tier picking head for said picking vehicle, said head movable between a lowered tier picking and releasing position and a raised tier transferring position;

extensible and retractable boom means coupling said tier picking head to said mobile picking vehicle for extending said tier picking head into a storage bin above articles stored thereon for removal of the uppermost tier of articles from the storage bin; and means for sequentially controlling said boom means and said picking head to extend said picking head into said storage bin, lower said head into contact with the uppermost tier of articles in said bin, raise and retract said picking head from said storage bin and then lower said picking head for depositing the uppermost tier of articles on said mobile transfer vehicle below said picking vehicle.

* * * * *